(12) United States Patent
Ishikura et al.

(10) Patent No.: US 10,581,318 B2
(45) Date of Patent: Mar. 3, 2020

(54) RESONANT CONVERTER INCLUDING CAPACITANCE ADDITION CIRCUITS

(71) Applicant: Murata Manufacturing Co., Ltd., Nagaokakyo-shi, Kyoto-fu (JP)

(72) Inventors: Yuki Ishikura, Nagaokakyo (JP); Koichi Ueki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/973,561

(22) Filed: May 8, 2018

(65) Prior Publication Data

US 2018/0262101 A1  Sep. 13, 2018

Related U.S. Application Data

(63) Continuation of application No. PCT/JP2016/083746, filed on Nov. 15, 2016.

(30) Foreign Application Priority Data

Dec. 4, 2015 (JP) .................................. 2015-237341

(51) Int. Cl.
*H02M 1/38* (2007.01)
*H02M 3/335* (2006.01)
(Continued)

(52) U.S. Cl.
CPC ............... *H02M 1/38* (2013.01); *H02M 1/08* (2013.01); *H02M 1/44* (2013.01);
(Continued)

(58) Field of Classification Search
CPC ...... H02M 3/28; H02M 3/337; H02M 3/3376; H02M 3/33592; H02M 3/33569;
(Continued)

(56) References Cited

U.S. PATENT DOCUMENTS 5,111,372 A   5/1992  Kameyama et al.
6,184,630 B1  2/2001  Qian et al.
(Continued)

FOREIGN PATENT DOCUMENTS

EP   2 823 781 A1   1/2015
JP   03-135368 A    6/1991
(Continued)

OTHER PUBLICATIONS

He et al., A composite soft switching circuit for power inverters, APEC '99, Fourteenth Annual Applied Power Electronics Conference and Exposition, 1999 Conference Proceedings (Cat. No. 99CH36285), IEEE, vol. 2, pp. 1282-1278. (Year: 1999).*

(Continued)

*Primary Examiner* — Nguyen Tran
*Assistant Examiner* — Monica Mata
(74) *Attorney, Agent, or Firm* — Keating & Bennett, LLP

(57) ABSTRACT

A power conversion device includes a power conversion circuit that performs switching control of first and second semiconductor switches connected in series and converts an input direct current voltage into an alternating current voltage. A switching adjustment circuit includes a first capacitance addition circuit that increases an output capacitance of the first semiconductor switch. The first capacitance addition circuit includes a first capacitive element and a first switching unit connected in series and is connected in parallel to the first semiconductor switch. A first driving control circuit drives and controls the first capacitance addition circuit. The first driving control circuit turns on the first switching unit when the first semiconductor switch is turned off, increasing the output capacitance of the first semiconductor switch, and turns off the first switching unit when a predetermined time period elapses after the first semiconductor switch is turned off.

15 Claims, 11 Drawing Sheets

(51) Int. Cl.
  *H02M 1/08*    (2006.01)
  *H02M 7/5387*  (2007.01)
  *H02M 1/44*    (2007.01)
  *H02M 1/00*    (2006.01)
  *H02M 1/34*    (2007.01)

(52) U.S. Cl.
  CPC ..... *H02M 3/33569* (2013.01); *H02M 7/5387* (2013.01); *H02M 2001/0009* (2013.01); *H02M 2001/0032* (2013.01); *H02M 2001/342* (2013.01); *H02M 2001/385* (2013.01)

(58) Field of Classification Search
  CPC ............ H02M 1/08; H02M 1/38; H02M 7/48; H02M 1/44; H02M 2001/0009; H02M 2001/0032; H02M 2001/342; H02M 2001/385; H02M 7/5387; Y02B 70/1433; Y02B 70/1475
  USPC .......................................................... 363/17
  See application file for complete search history.

(56) References Cited

U.S. PATENT DOCUMENTS

| | | |
|---|---|---|
| 2002/0075700 A1 | 6/2002 | Birumachi |
| 2006/0267665 A1 | 11/2006 | Kawamoto |
| 2008/0203991 A1* | 8/2008 | Williams .............. H02M 3/158 323/288 |
| 2013/0049654 A1 | 2/2013 | Kure |
| 2015/0103561 A1* | 4/2015 | Dai .................... H02M 3/3353 363/17 |
| 2018/0183318 A1 | 6/2018 | Uenaka et al. |

FOREIGN PATENT DOCUMENTS

| | | | | |
|---|---|---|---|---|
| JP | 07-170734 A | | 7/1995 | |
| JP | 11-87042 A | | 3/1999 | |
| JP | 2000-050639 A | | 2/2000 | |
| JP | 2002-101655 A | | 4/2002 | |
| JP | 2002315351 A | * | 10/2002 | |
| JP | 2002-537751 A | | 11/2002 | |
| JP | 2002-369508 A | | 12/2002 | |
| JP | 2004-040854 A | | 2/2004 | |
| JP | 2004-048945 A | | 2/2004 | |
| JP | 2004048945 A | * | 2/2004 | ............ H05B 6/062 |
| JP | 2007-013916 A | | 1/2007 | |
| JP | 2012-143116 A | | 7/2012 | |
| JP | 2013-066371 A | | 4/2013 | |
| WO | 2015/178106 A1 | | 11/2015 | |

OTHER PUBLICATIONS

Official Communication issued in International Patent Application No. PCT/JP2016/083746, dated Dec. 20 2016.

Official Communication issued in Japanese Patent Application No. 2017-553750, dated Jan. 22, 2019.

* cited by examiner

RESONANT CONVERTER INCLUDING CAPACITANCE ADDITION CIRCUITS

CROSS REFERENCE TO RELATED APPLICATIONS

This application claims the benefit of priority to Japanese Patent Application No. 2015-237341 filed on Dec. 4, 2015 and is a Continuation Application of PCT Application No. PCT/JP2016/083746 filed on Nov. 15, 2016. The entire contents of each application are hereby incorporated herein by reference.

BACKGROUND OF THE INVENTION

1. Field of the Invention

The present invention relates to a power conversion device that includes semiconductor switches connected in series.

2. Description of the Related Art

Turning a switching element on and off in a power conversion device causes abrupt changes in current and voltage, which may generate noise. The noise may adversely affect other control circuits in the device. Japanese Unexamined Patent Application Publication No. 2007-13916 describes a method to reduce the level of noise of this type. In the method described in Japanese Unexamined Patent Application Publication No. 2007-13916, a rising edge of a PWM signal applied to the switching element is shaped into a substantially sine waveform when the switching element is under switching control. This changes the waveform of a current flowing through a load to have a smoother slope at the rising edge and makes the current change moderate, thus avoiding noise generation resulting from abrupt changes in current and voltage.

Recently, switching elements using compound semiconductors, such as silicon carbide (SiC) and gallium nitride (GaN), have been put into practical use. This enables power conversion devices to operate at high frequencies, and resulting miniaturization of passive components is encouraging attempts to downsize such power conversion devices. However, in Japanese Unexamined Patent Application Publication No. 2007-13916, shaping the rising edge of a PWM signal into a substantially sine waveform increases the dead time of a switching element, which decreases the switching frequency. In short, it is difficult to increase the switching frequency using the method described in Japanese Unexamined Patent Application Publication No. 2007-13916.

SUMMARY OF THE INVENTION

Preferred embodiments of the present invention provide power conversion devices that reduce noise generated during switching operation while maintaining high-frequency operation.

A power conversion device according to a preferred embodiment of the present invention includes a power converter that performs switching control of a first semiconductor switch and a second semiconductor switch connected in series and converts an input direct current voltage into an alternating current voltage.

The power conversion device includes a first capacitance addition circuit that increases an output capacitance of the first semiconductor switch and a first driving control circuit that drives and controls the first capacitance addition circuit.

The first capacitance addition circuit includes a first capacitive element and a first switching circuit connected in series and is connected in parallel to the first semiconductor switch, and the first driving control circuit turns on the first switching circuit when the first semiconductor switch is turned off, increasing the output capacitance of the first semiconductor switch, and turns off the first switching circuit when a predetermined time period elapses after the first semiconductor switch is turned off.

With this configuration, the first switching circuit remains on until the predetermined time period elapses after the first semiconductor switch is turned off, and the first capacitive element is connected in parallel to a capacitance between terminals of the first semiconductor switch during this time period. This increases an equivalent capacitance between the terminals of the first semiconductor switch during the predetermined time period. Although a voltage between the terminals of the first semiconductor switch increases when the first semiconductor switch is turned off, the increase in the voltage between the terminals is gradual because the equivalent capacitance between the terminals of the first semiconductor switch is large during the predetermined time period elapses as described above. The gradual increase in the voltage between the terminals removes overshoot generated when the first semiconductor switch is turned off. Consequently, noise generation due to the overshoot is able to be avoided.

The first driving control circuit preferably turns on the first switching circuit while the first semiconductor switch is on. In this configuration, the first switching circuit is controlled to remain on while the first semiconductor switch is on, and a time point when the first switching circuit is turned off is delayed by a small amount of time, easily achieving a state in which the first switching circuit is on when the first semiconductor switch is turned off. Thus, simple control is achieved as compared to a case in which the first switching circuit is controlled to be turned on at the same time as the first semiconductor switch is turned off.

In a power conversion device according to a preferred embodiment of the present invention, the first driving control circuit sets the first switching circuit to off state while the first semiconductor switch is on. The first driving control circuit turns on the first switching circuit when the first semiconductor switch is turned off. The first driving control circuit turns off the first switching circuit again when the predetermined time period elapses after the first switching circuit is turned on. This configuration enables a voltage between the terminals of the first semiconductor switch to increase gradually in two stages when the first semiconductor switch is turned off.

In a power conversion device according to a preferred embodiment of the present invention, the first driving control circuit turns the first switching circuit on and off a plurality of times during one period of a switching cycle of the first semiconductor switch. This configuration enables the voltage between the terminals of the first semiconductor switch to increase gradually in a plurality of stages when the first semiconductor switch is turned off.

A power conversion device according to a preferred embodiment of the present invention preferably includes a resonance circuit that includes the first capacitive element and through which a current flows when the first switching circuit is turned off. This configuration reduces noise related to specific harmonics.

A power conversion device according to a preferred embodiment of the present invention preferably further includes a resonance inductor that is included in the resonance circuit and resonates with the first capacitive element, a series circuit that includes the resonance inductor, a first diode, and an additional capacitive element that are connected in series in this order and that is connected in parallel to the first capacitance addition circuit, and a second diode connected across a node between the first capacitive element and the first switching circuit and a node between the first diode and the additional capacitive element.

The additional capacitive element preferably has a smaller capacitance than the first capacitive element.

The first diode is preferably connected in a direction in which a resonance current flows into the resonance circuit.

The second diode is preferably connected in a direction in which a charging current flows through the first capacitive element.

The above configuration is able to effectively reduce the noise related to the specific harmonics.

The first capacitive element may be a fourth semiconductor switch having a parasitic capacitance, and the additional capacitive element may be a fifth semiconductor switch having a parasitic capacitance. This configuration makes chip components, such as capacitors, unnecessary because the fourth semiconductor switch and the fifth semiconductor switch are able to be provided on a semiconductor substrate.

At least the fourth semiconductor switch, the fifth semiconductor switch, the first diode, and the second diode may be included in a single integrated circuit. This configuration makes chip components, such as capacitors, unnecessary because each of the semiconductor switches is able to be provided on a semiconductor substrate.

A power conversion device according to a preferred embodiment of the present invention may further include a current detector that detects a magnitude of a load current, which is an output current from the power converter, and a dead-time adjusting circuit that adjusts, in accordance with the magnitude of the load current, a length of time during which the first semiconductor switch and the second semiconductor switch are both off. This configuration makes highly efficient operation possible irrespective of load amount.

The dead-time adjusting circuit may adjust, in accordance with the magnitude of the load current, a length of time during which the first switching circuit is on. This configuration makes further highly efficient operation possible irrespective of the load amount.

A power conversion device according to a preferred embodiment of the present invention may include a current detecting circuit that detects a magnitude of a load current, which is an output current from the power converter, and a cutoff circuit that cuts off a charging path to the first capacitive element when the magnitude of the load current falls below a threshold. This configuration enables efficiency improvement of the entire power conversion device when a load is light by causing the first capacitance addition circuit to stop operating when the load is light.

The first semiconductor switch and the second semiconductor switch are preferably gallium nitride semiconductor devices, and the first switching circuit is preferably a silicon semiconductor device. This configuration enables miniaturization of passive components by achieving switching operation at high frequencies, which is enabled by high-speed response of the gallium nitride semiconductor devices. This configuration also enables cost reduction by using the silicon semiconductor device for the first switching circuit, for which high-speed response is not required.

A power conversion device according to a preferred embodiment of the present invention may further includes a second capacitance addition circuit that increases an output capacitance of the second semiconductor switch and a second driving control circuit that drives and controls the second capacitance addition circuit.

The second capacitance addition circuit includes a second capacitive element and a second switching circuit connected in series and is connected in parallel to the second semiconductor switch.

The second driving control circuit may be configured to turn on the second switching circuit when the second semiconductor switch is turned off, increasing the output capacitance of the second semiconductor switch, and turn off the second switching circuit when a predetermined time period elapses after the second semiconductor switch is turned off.

This configuration is able to reduce noise generated when the second semiconductor switch is switched.

According to preferred embodiments of the present invention, noise generated during switching operation is reduced while maintaining high frequency operation.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
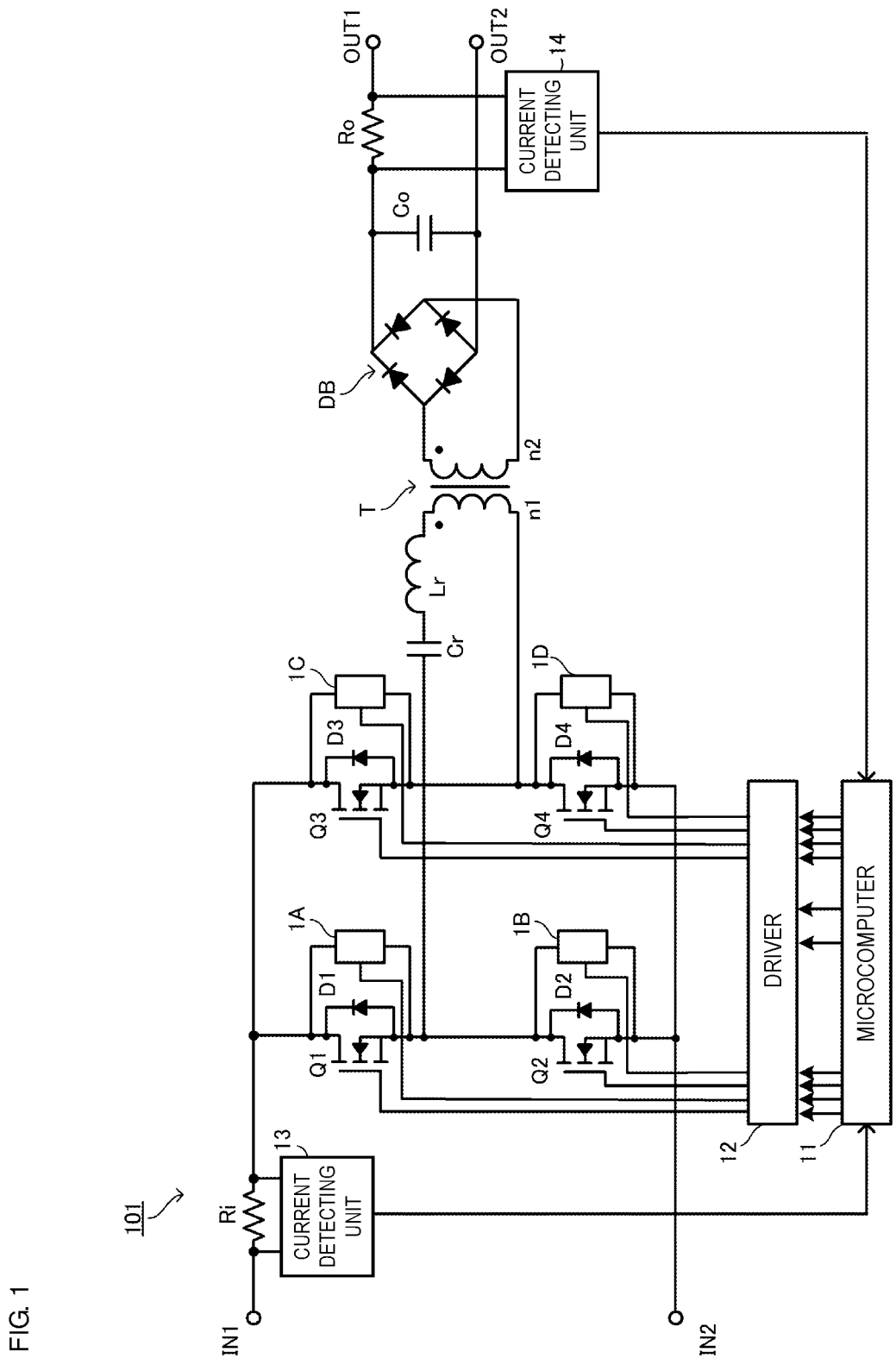
FIG. 1 is a circuit diagram of a power conversion device 101 according to a first preferred embodiment of the present invention.

FIG. 1 is a circuit diagram of a power conversion device 101 according to a first preferred embodiment of the present invention.

The power conversion device 101 includes input ports IN1 and IN2 to which a direct current voltage is input and output ports OUT1 and OUT2 to which a load is connected. The power conversion device 101 is preferably a DC-DC converter, for example, which transforms a direct current voltage that is input from the input ports IN1 and IN2 and outputs the transformed voltage to the output ports OUT1 and OUT2. This preferred embodiment preferably includes an LLC resonant converter.

A switching circuit is connected to the input ports IN1 and IN2. The switching circuit preferably has a full bridge configuration in which a series circuit of switching elements Q1 and Q2 and a series circuit of switching elements Q3 and Q4 are connected to each other in parallel. The switching elements Q1 and Q3 are high-side switching elements, and the switching elements Q2 and Q4 are low-side switching elements.

In the present preferred embodiment, one of the switching elements Q1 and Q2 corresponds to a "first semiconductor switch", and the other corresponds to a "second semiconductor switch". Similarly, one of the switching elements Q3 and Q4 corresponds to a "first semiconductor switch", and the other corresponds to a "second semiconductor switch". The switching circuit corresponds to a "power converter".

The switching elements Q1, Q2, Q3, and Q4 are preferably GaN (gallium nitride)-FETs, for example, which enable miniaturization of passive components by achieving switching operation at high frequencies. The switching elements Q1, Q2, Q3, and Q4 are connected in parallel to diodes D1, D2, D3, and D4, respectively. The diodes D1, D2, D3, and D4 are connected such that the forward direction of each of the diodes matches the source-to-drain direction of a corresponding one of the switching elements Q1, Q2, Q3, and Q4. Each of the drains of the switching elements Q1 to Q4 corresponds to an "input side terminal", and each of the sources corresponds to an "output side terminal".

The switching elements Q1, Q2, Q3, and Q4 may alternatively be SiC (silicon carbide)-FETs or Si-FETs, for example. In such a case, a body diode is provided for each switching element, and the diodes D1, D2, D3, and D4 are unnecessary.

Switching adjustment circuits 1A and 1C are respectively connected in parallel to the switching elements Q1 and Q3 to define and function as the high-side switching elements among the switching elements Q1, Q2, Q3, and Q4, and switching adjustment circuits 1B and 1D are respectively connected to the switching elements Q2 and Q4 to define and function as the low-side switching elements. The switching adjustment circuits 1A, 1B, 1C, and 1D are circuits that reduce noise generated by overshoot and undershoot of the switching elements Q1, Q2, Q3, and Q4. The switching adjustment circuits 1A, 1B, 1C, and 1D will be described later.

A node between the switching elements Q1 and Q2 is connected to one end of the primary winding n1 of a transformer T with a capacitor Cr and an inductor Lr interposed therebetween. A node between the switching elements Q3 and Q4 is connected to the other end of the primary winding n1 of the transformer T. The resonance capacitor Cr, the resonance inductor Lr, and the primary winding n1 of the transformer T define a resonance circuit.

The secondary winding n2 of the transformer T is connected to the output ports OUT1 and OUT2 with a rectifying smoothing circuit interposed therebetween, the rectifying smoothing circuit including a diode bridge DB and a smoothing capacitor Co. The rectifying smoothing circuit converts an alternating current voltage into a direct current voltage and outputs the direct current voltage to the output ports OUT1 and OUT2.

A current detecting resistor Ri is connected across the input port IN1 and the switching circuit. A current detecting circuit 13 is connected to the current detecting resistor Ri. The current detecting circuit 13 detects a current flowing into the switching circuit by measuring a voltage across the current detecting resistor Ri. A current detecting resistor Ro is connected across the output port OUT1 and the diode bridge DB. A current detecting circuit 14 is connected to the current detecting resistor Ro. The current detecting circuit 14 detects a current flowing through a load by measuring a voltage across the current detecting resistor Ro.

A microcomputer 11 is configured and/or programmed to read values detected by the current detecting circuits 13 and 14. The microcomputer 11 outputs driving signals to a driver 12 in accordance with load amount determined from the values detected by the current detecting circuits 13 and 14. The driver 12 generates PWM signals in accordance with the driving signals and outputs individual PWM signals to gates of the corresponding switching elements Q1, Q2, Q3, and Q4.

The switching adjustment circuits 1A, 1B, 1C, and 1D will be described below.

Figure 2:
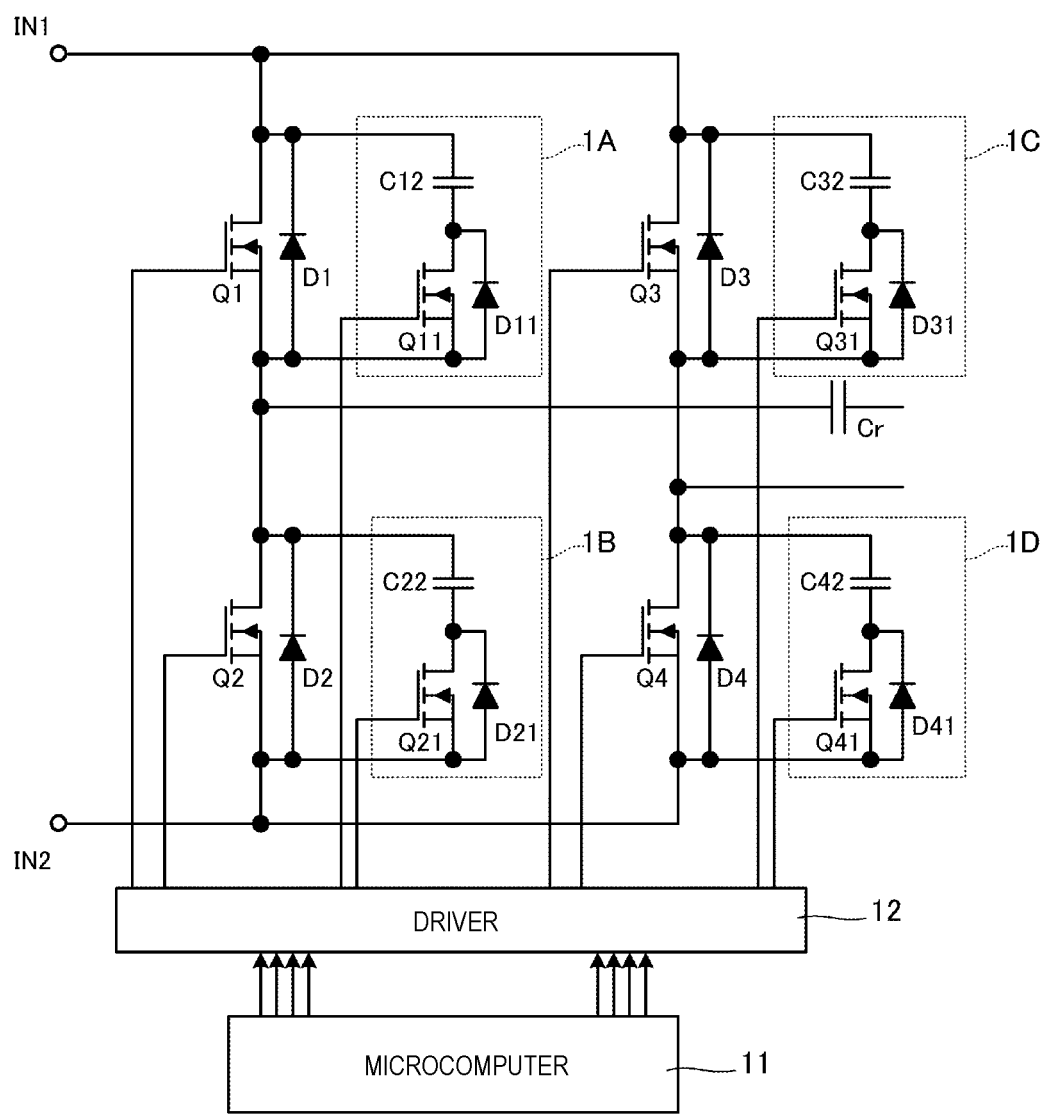
FIG. 2 is a circuit diagram illustrating configurations of switching adjustment circuits 1A, 1B, 1C, and 1D.

FIG. 2 is a circuit diagram illustrating configurations of the switching adjustment circuits 1A, 1B, 1C, and 1D. The switching adjustment circuit 1A is a series circuit including a capacitor C12 and a switching element Q11. The switching element Q11 is a Si-FET, and a diode D11 is a body diode of the switching element Q11. The switching adjustment circuit 1A is connected in parallel to the switching element Q1.

Configurations of the switching adjustment circuits 1B, 1C, and 1D are similar to the configuration of the switching adjustment circuit 1A. The switching adjustment circuit 1B is a series circuit including a capacitor C22 and a switching element Q21. The switching adjustment circuit 1C is a series circuit including a capacitor C32 and the switching element Q31. The switching adjustment circuit 1D is a series circuit including a capacitor C42 and the switching element Q41.

In the present preferred embodiment, the microcomputer 11 corresponds to a "first driving control circuit". The series circuit of the capacitor C12 and the switching element Q11 included in the switching adjustment circuit 1A corresponds to a "first capacitance addition circuit". The capacitor C12 in the switching adjustment circuit 1A corresponds to a "first capacitive element", and the switching element Q11 corresponds to a "first switching unit" and a "third semiconductor switch".

In the present preferred embodiment, the microcomputer 11 corresponds to a "second driving control circuit". The series circuit of the capacitor C22 and the switching element Q21 included in the switching adjustment circuit 1B corresponds to a "second capacitance addition circuit". The capacitor C22 in the switching adjustment circuit 1B corresponds to a "second capacitive element", and the switching element Q21 corresponds to a "second switching unit".

Figure 3:
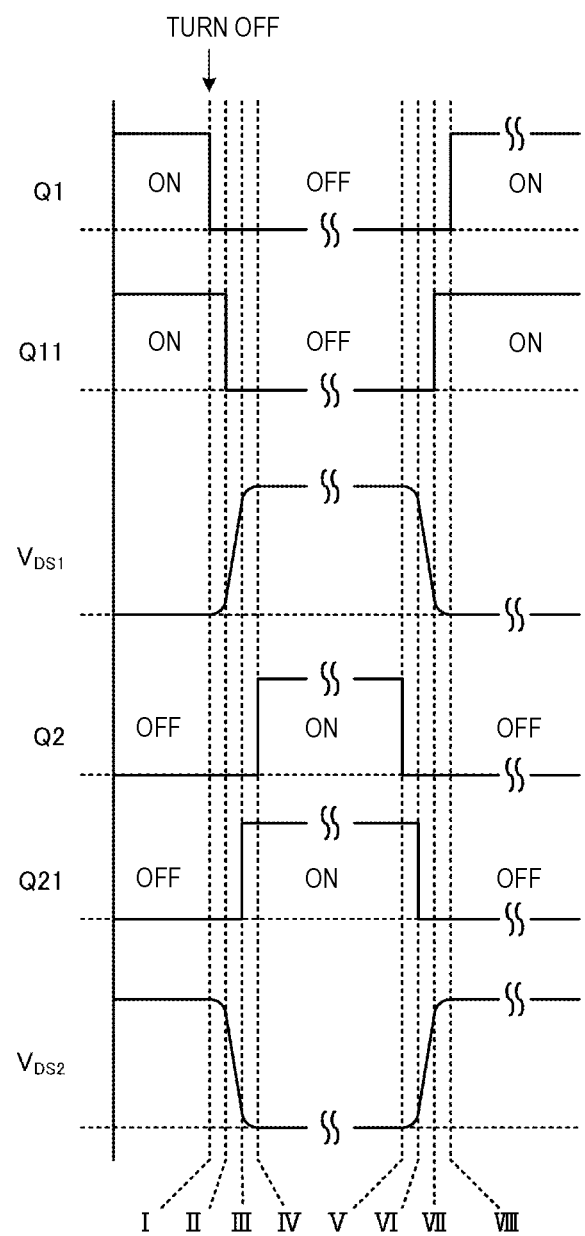
FIG. 3 depicts waveforms illustrating time points when switching elements Q1 and Q11 are switched, a change in a drain-source voltage $V_{DS1}$ of the switching element Q1, time points when switching elements Q2 and Q21 are switched, and a change in a drain-source voltage $V_{DS2}$ of the switching element Q2.

FIG. 3 depicts waveforms illustrating time points when the switching elements Q1 and Q11 are switched, a change in a drain-source voltage $V_{DS1}$ of the switching element Q1, time points when the switching elements Q2 and Q21 are switched, and a change in a drain-source voltage $V_{DS2}$ of the switching element Q2. Waveforms in a half cycle of a switching frequency of the switching element Q1 are depicted at representative time points (I) to (VIII).

The drain-source voltage $V_{DS1}$ of the switching element Q1 is zero or approximately zero while the switching element Q1 remains on. The switching element Q11 is also in on state at this time, but almost no current flows through the switching element Q11 because the switching element Q1 is on.

When the switching element Q1 is turned off at the time point (I), the switching element Q11 remains in on state. Thus, the capacitor C12 is connected in parallel to the drain-source path of the switching element Q1. This increases an equivalent output capacitance Co1 of the switching element Q1, leading to a gradual increase in the drain-source voltage $V_{DS1}$ of the switching element Q1.

When a fixed time period elapses after the switching element Q1 is turned off, the switching element Q11 is turned off (time point (II)). Then, the capacitor C12 is disconnected, and the equivalent output capacitance Co1 of the switching element Q1 decreases, leading to a rapid increase in the voltage $V_{DS1}$.

When another fixed time period elapses (time point (III)) after the switching element Q11 is turned off, the switching element Q21 is turned on. The switching element Q21 is included in the switching adjustment circuit 1B, which is connected between the drain and the source of the switching element Q2 and includes a series circuit of the capacitor C22 and the switching element Q21. The switching element Q2 corresponds to the low-side switch and the switching element Q1 corresponds to the high-side switch.

When the switching element Q21 is turned on at the time point (III), regeneration, towards the transformer T, of electric charge stored in the capacitor C22 when the switching element Q2 is turned off a half cycle before the half cycle represented by the time points (I) to (VIII) is performed. Because the capacitor C22 has the same or substantially the same capacitance as the capacitor C12, as in the time period between the time points (I) and (II), the drain-source voltage $V_{DS2}$ of the switching element Q2 gradually decreases. Since the switching element Q1 and the switching element Q2 are connected in series, the drain-source voltage $V_{DS1}$ of the switching element Q1 is also affected symmetrically or substantially symmetrically. Consequently, the voltage $V_{DS1}$ gradually increases. Thus, generation of overshoot is able to be avoided. The capacitance of the capacitor C12 is preferably set to approximately ten times the output capacitance value of the switching element Q1, for example.

A time period from the time point (I) to the time point (II) is able to be adjusted by using the timing of a control signal that is output from the microcomputer 11. The time period from the time point (I) to the time point (II) corresponds to a "predetermined time period". Subsequently, when the output capacitance Co1 of the switching element Q1 and the capacitor C12 are fully charged (time point (IV)), the voltage $V_{DS1}$ becomes constant or substantially constant, and the low-side switching element Q2 is turned on at the time point (IV).

Then, when the switching element Q2 is turned off at the time point (V), the potential on the drain side of the switching element Q2, which is the source side of the switching element Q1, increases, and the voltage $V_{DS1}$ starts to decrease relatively. For the low-side switch, in the same or substantially the same manner as the high-side switch during the time period between the time points (I) and (II), the drain-source voltage $V_{DS2}$ of the switching element Q2 gradually increases because the switching element Q21 in the switching adjustment circuit 1B is in on state. Thus, the drain-source voltage $V_{DS1}$ of the switching element Q1 gradually decreases. Subsequently, when the switching element Q21 is turned off (time point (VI)), the capacitor C22 is substantially disconnected, and the drain-source voltage $V_{DS2}$ of the switching element Q2 rapidly increases. Along with this, the drain-source voltage $V_{DS1}$ of the switching element Q1 rapidly decreases. Then, when the switching element Q11 is turned on (time point (VII)) before the switching element Q1 is turned on, the electric charge stored in the capacitor C12 during the time period between the time points (I) and (II) is regenerated towards the input power supply. At this time, the drain-source voltage $V_{DS1}$ of the switching element Q1 gradually decreases as in the time period between the time points (I) and (II). The switching element Q1 is turned off when the electric charge has been regenerated (time point (VIII)). Thus, generation of undershoot is able to be avoided.

Electric charge stored in the capacitor C12 while the switching element Q1 remains off is regenerated during a dead time before the switching element Q2 is subsequently turned on, leading to no increase in loss.

Thus, because the switching elements Q1 to Q4 are coupled to the switching adjustment circuits 1A to 1D, respectively, the drain-source voltages $V_{DS1}$ to $V_{DS4}$ of the switching elements Q1 to Q4 gradually rise and fall. This eliminates overshoots and undershoots that occur when the switching elements Q1 to Q4 are switched and reduces noise. The switching elements Q1 to Q4 are preferably PWM-controlled using rectangular wave signals and coupled to external circuits, which are the switching adjustment circuits 1A to 1D, leading to gradual changes in the initial portion of the rise time and in the final portion of the fall time. Thus, the dead times of the switching elements Q1 to Q4 do not increase. This enables the power conversion device 101 to operate at high frequencies, achieving miniaturization of passive components.

In the present preferred embodiment, the power conversion device 101 is preferably a DC-DC converter using an LLC resonant converter, for example. The present preferred embodiment is also applicable to a DC-DC converter of a different type, which uses a high-side switch and a low-side switch, such as a full-bridge, a half-bridge, or other suitable DC-DC converters. The present preferred embodiment is also applicable to an AC-DC converter and a DC-AC inverter.

In the present preferred embodiment, although an example in which the switching elements Q1 to Q4 and Q11 to Q41 are all driven and controlled using a microcomputer is illustrated, an analog circuit or a logic circuit may also be used instead of the microcomputer.

Second Preferred Embodiment

A power conversion device according to a second preferred embodiment of the present invention differs from the power conversion device according to the first preferred embodiment in that the switching adjustment circuits are driven at different time points. The difference will be described below. Description will be provided using FIG. 2 because a circuit configuration is the same or substantially the same as the circuit configuration in the first preferred embodiment.

Figure 4:
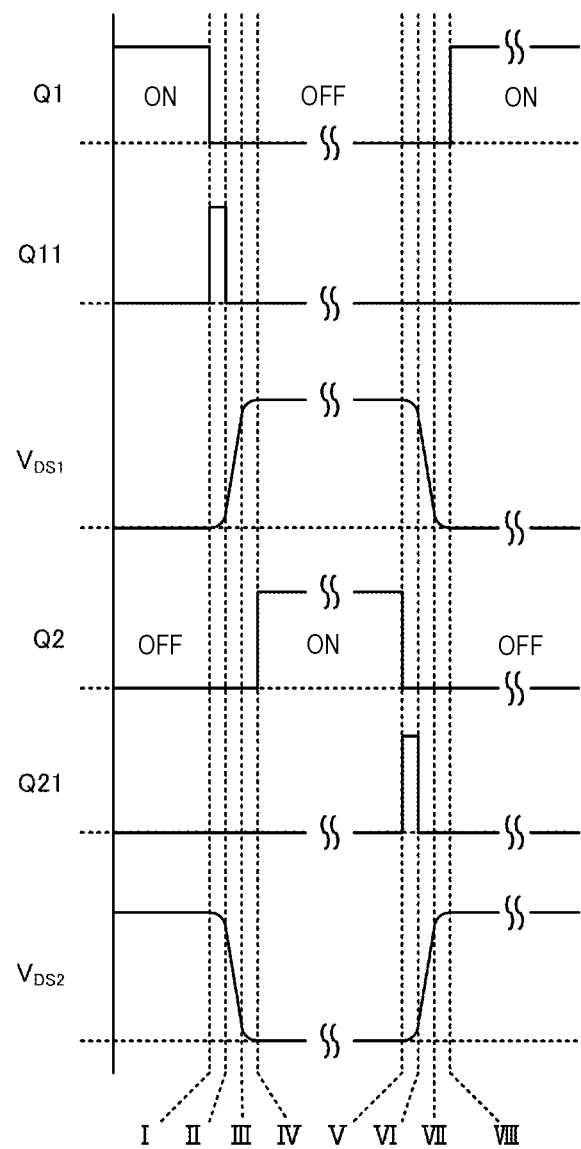
FIG. 4 depicts waveforms illustrating time points when the switching elements Q1, Q2, Q11, and Q21 are switched, a change in the drain-source voltage $V_{DS1}$ of the switching element Q1, and a change in the drain-source voltage $V_{DS2}$ of the switching element Q2.

FIG. 4 depicts waveforms illustrating time points when switching elements Q1, Q2, Q11, and Q21 in the power conversion device according to the second preferred embodiment are switched, a change in a drain-source voltage $V_{DS1}$ of the switching element Q1, and a change in a drain-source voltage $V_{DS2}$ of the switching element Q2.

In contrast to the example illustrated in FIG. 3, the switching element Q11 remains in off state, instead of on state, while the switching element Q1 is on. In this configuration, the switching element Q11 is turned on immediately after the switching element Q1 is turned off (time point (I)) and remains on for a predetermined time period.

The drain-source voltage $V_{DS1}$ of the switching element Q1 increases when the switching element Q1 is turned off at the time point (I).

When the switching element Q11 is turned on at the same or substantially the same time as the switching element Q1 is turned off, the capacitor C12 becomes connected in parallel to the output capacitance Co1 of the switching element Q1. Thus, the equivalent output capacitance Co1 increases, and the voltage $V_{DS1}$ rises gradually.

Subsequently, the switching element Q11 is turned off when the predetermined time period elapses (time point (II)). The parallel connected capacitor C12 is disconnected from the output capacitance Co1, and the equivalent output capacitance Co1 decreases (returns to the original value), leading to a rapid increase in the voltage $V_{DS1}$.

When the voltage $V_{DS1}$ further increases (time point (III)), the drain-source voltage $V_{DS2}$ of the switching element Q2 decreases in relation to the voltage $V_{DS1}$. The switching element Q2, which is a low-side switch, is connected in series to the switching element Q1, which is a high-side switch. Electric charge stored in the preceding half cycle remains at this time point in the capacitor C22, which is connected in parallel to the drain-source path of the switching element Q2. The electric charge stored in the capacitor C22 is regenerated towards the transformer T through a diode D21, which is connected in parallel to the drain-source path of the switching element Q21. Because the voltage $V_{DS2}$ is relatively low, the time to regenerate the stored electric charge is long. As a result, the voltage $V_{DS2}$ has a gradually decreasing waveform. Along with this, the voltage $V_{DS1}$ also has a gradually increasing waveform. The time period from the time point (I) to the time point (II) corresponds to the "predetermined time period".

Subsequently, when the electric charge stored in the output capacitance of the switching element Q2 and the capacitor C22 has been fully regenerated, the drain-source voltage $V_{DS2}$ of the switching element Q2 becomes zero or approximately zero (time point (IV)), and the switching element Q2 is turned on.

Then, when the switching element Q2 is turned off at the time point (V), the switching element Q21 is turned on simultaneously. As a result, the drain-source voltage $V_{DS2}$ of the switching element Q2 gradually increases, similarly to the switching element Q1, and the drain-source voltage $V_{DS1}$ of the switching element Q1 gradually decreases in relation to the voltage $V_{DS2}$. Subsequently, when the switching element Q21 is turned off after the predetermined time period (time point (VI)), the capacitor C22 is disconnected from the drain-source path of the switching element Q2, and the voltage $V_{DS2}$ rapidly increases. Along with this, the drain-source voltage $V_{DS1}$ rapidly decreases. When the voltage $V_{DS1}$ further decreases (time point (VII)), electric charge stored in the preceding half cycle remains in the capacitor C12. The electric charge stored in the capacitor C12 is regenerated through a diode D21, which is connected in parallel to the drain-source path of the switching element Q11. Because the voltage $V_{DS1}$ is relatively low, the time to regenerate the stored electric charge is long. As a result, the voltage $V_{DS1}$ has a gradually decreasing waveform. Along with this, the voltage $V_{DS2}$ has a gradually increasing waveform. Thus, generation of undershoot is able to be avoided. Subsequently, when the voltage $V_{DS1}$ becomes zero or approximately zero, the switching element Q1 is turned on (time point (VIII)).

Thus, if the first driving control circuit and the second driving control circuit (control by the microcomputer 11) are configured to operate as illustrated in FIG. 4, gradual rise and fall of the individual drain-source voltages $V_{DS1}$ to $V_{DS4}$ of the switching elements Q1 to Q4 is able to be achieved. Consequently, overshoots and undershoots that occur when the switching elements Q1 to Q4 are switched are avoided, and noise is reduced. In addition, the power conversion device is able to be operated at high frequencies, realizing miniaturization of passive components.

Third Preferred Embodiment

A power conversion device according to a third preferred embodiment of the present invention differs from the power conversion device according to the second preferred embodiment in that each of the switching adjustment circuits further includes a resonance circuit. The difference will be described below.

Figure 5:
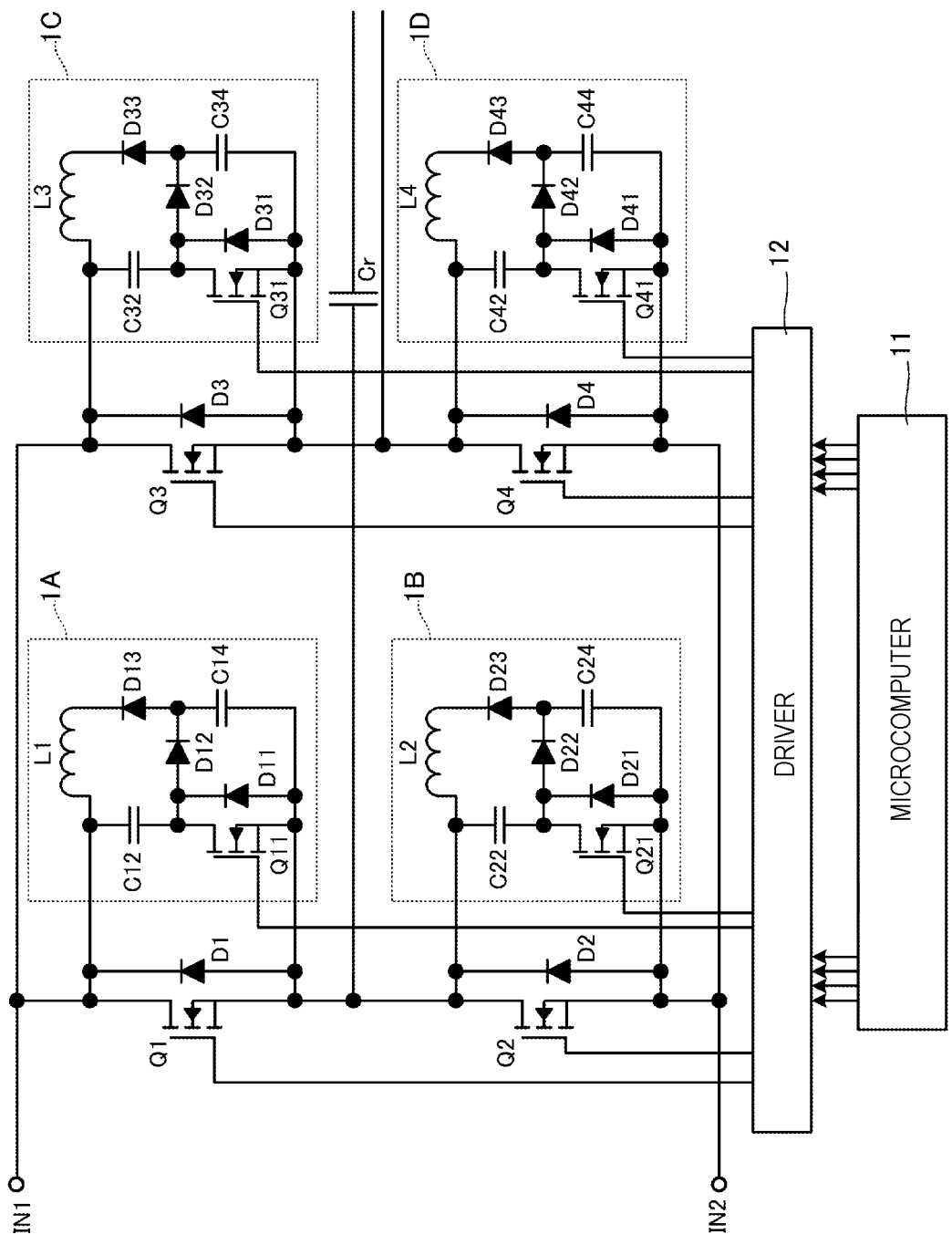
FIG. 5 is a circuit diagram illustrating configurations of the switching adjustment circuits 1A, 1B, 1C, and 1D according to a third preferred embodiment of the present invention.

FIG. 5 is a circuit diagram illustrating configurations of switching adjustment circuits 1A, 1B, 1C, and 1D according to the third preferred embodiment.

The switching adjustment circuit 1A includes a series circuit including an inductor L1, a diode D13, and a capacitor C14. The diode D13 is disposed with the cathode thereof on the inductor L1 side. The series circuit is connected in parallel to the capacitor C12 and the switching element Q11. The inductor L1 defines a resonance circuit with the capacitor C12. The capacitance of the capacitor C12 is set to a value larger than the capacitance of the capacitor C14. Specifically, the capacitance of the capacitor C12 is preferably approximately ten times, for example.

The diode D13 corresponds to a "first diode". The capacitor C14 corresponds to an "additional capacitive element".

A diode D12 is connected across a node between the capacitor C12 and the switching element Q11 and a node between the diode D13 and the capacitor C14. The diode D12 is disposed with the cathode thereof on the side of the node between the diode D13 and the capacitor C14. The diode D12 corresponds to a "second diode".

In this configuration, when the switching element Q11 is off, a current flows along the path including the capacitor C12, the diode D12, and the capacitor C14 in this order, and the capacitor C12 and the capacitor C14 are charged. When the switching element Q11 is turned on under the condition that the capacitor C14 is fully charged and the capacitor C12 is not fully charged, a resonance current flows along the path including the diode D13, the inductor L1, the capacitor C12, and the switching element Q11 in this order, and the electric charge stored in the capacitor C14 moves so as to charge the capacitor C12.

Configurations and operation of the switching adjustment circuits 1B, 1C, and 1D are the same as or similar to the configuration and operation of the switching adjustment circuit 1A.

Figure 6:
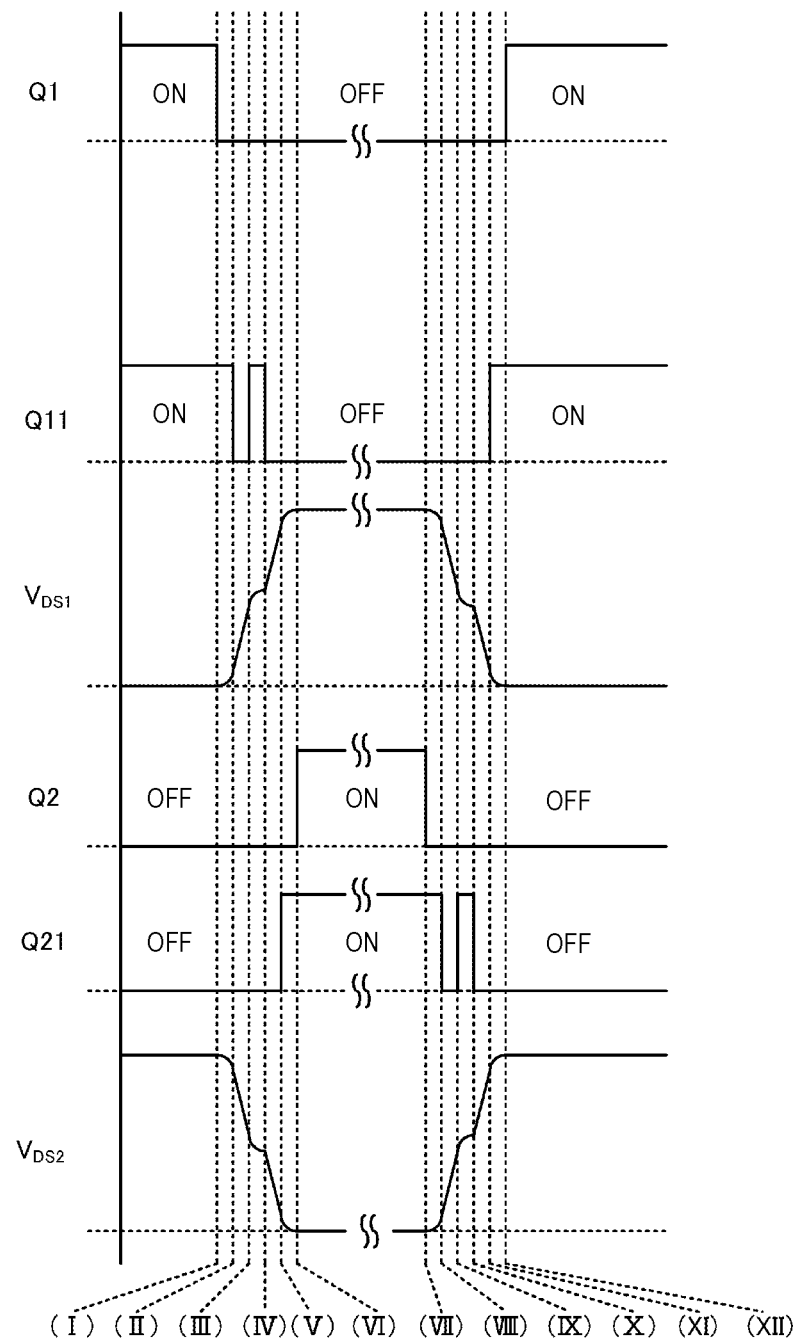
FIG. 6 depicts waveforms illustrating time points when the switching elements Q1, Q11, Q2, and Q21 are switched, a change in the drain-source voltage $V_{DS1}$ of the switching element Q1, and a change in the drain-source voltage $V_{DS2}$ of the switching element Q2.

FIG. 6 depicts waveforms illustrating time points when switching elements Q1, Q11, Q2, and Q21 are switched, a change in the drain-source voltage $V_{DS1}$ of the switching element Q1, and a change in the drain-source voltage $V_{DS2}$ of the switching element Q2.

The drain-source voltage $V_{DS1}$ of the switching element Q1 is zero or approximately zero while the switching element Q1 remains on. The switching element Q11 is on at this time and is turned off (time point (II)) when a predetermined time period elapses after the switching element Q1 is turned off.

The drain-source voltage $V_{DS1}$ of the switching element Q1 increases when the switching element Q1 is turned off at the time point (I). At this time, the voltage $V_{DS1}$ gradually increases as described in the first preferred embodiment.

When the switching element Q11 is turned off (time point (II)), the voltage $V_{DS1}$ rapidly increases because the equivalent output capacitance Co1 of the switching element Q1 decreases. At this time, a current flows along the path including the capacitor C12, the diode D12, and the capacitor C14 in this order, and the capacitor C12 and the capacitor C14 are charged. The capacitance of the capacitor C12 is preferably larger than the capacitance of the capacitor C14, and the capacitor C14 is fully charged earlier than the capacitor C12.

The microcomputer 11 turns on the switching element Q11 again before the capacitor C12 is fully charged (time point (III)). When the switching element Q11 is turned on, a resonance current flows along the path including the diode D13, the inductor L1, the capacitor C12, and the switching element Q11 in this order. A resonant waveform occurs in the voltage $V_{DS1}$ because of this resonance current flow. This resonance enables the waveform of the voltage $V_{DS1}$ to have an inflection point during the rise and enables specific harmonics to be reduced. Japanese Unexamined Patent Application Publication No. 2009-212846 discloses that specific harmonics are able to be reduced by adding an inflection point (broken line waveform) described above.

The microcomputer 11 is configured and/or programmed to turn off the switching element Q11 when a fixed time period elapses (time point (IV)). Then, the parallel connected capacitor C12 is disconnected from the output capacitance Co1 of the switching element Q1, and the equivalent output capacitance Co1 decreases (returns to the original value), leading to a second rapid increase in the voltage $V_{DS1}$.

When the voltage $V_{DS1}$ further increases (time point (V)), the drain-source voltage $V_{DS2}$ of the switching element Q2 decreases symmetrically or substantially symmetrically. The switching element Q2, which is a low-side switch, is connected in series to the switching element Q1, which is a high-side switch. At this time, the switching element Q21, which is connected in parallel to the drain-source path of the switching element Q2, is turned on. The time period from the time point (I) to the time point (V) corresponds to a "predetermined time period".

When the switching element Q21 is turned on, the electric charge stored in the capacitor C22 is regenerated towards the transformer T. The voltage $V_{DS2}$ at this time is relatively low, and the capacitance of the capacitor C22 is relatively large as described above. Accordingly, it takes a long time to regenerate all of the electric charge. As a result, the voltage $V_{DS2}$ gradually decreases, and symmetrically or substantially symmetrically the voltage $V_{DS1}$ gradually increases, leading to a waveform representing a gradual change. Thus, generation of overshoot is able to be avoided. When the output capacitance Co1 of the switching element Q1 and the capacitor C12 are fully charged, the voltage $V_{DS1}$ becomes constant or substantially constant (time point (VI)), and the switching element Q2 is turned on.

Subsequently, when the switching element Q2 is turned off at the time point (VII), the voltage $V_{DS2}$ starts to increase. During the time period between the time point (VII) and the time point (XII), the switching element Q2 and the switching element Q21 perform operation similar to the operation performed by the switching element Q1 and the switching element Q11 during the time period between the time point (I) and the time point (VI). Consequently, the voltage $V_{DS1}$ of the switching element Q1 has a symmetrical or substantially symmetrical waveform. Thus, generation of undershoot is able to be avoided.

Thus, even if the first driving control circuit and the second driving control circuit (control by the microcomputer 11) are configured as illustrated in FIG. 5, gradual rise and fall of the individual drain-source voltages $V_{DS1}$ to $V_{DS4}$ of the switching elements Q1 to Q4 are able to be achieved. Consequently, overshoots and undershoots that occur when the switching elements Q1 to Q4 are switched are avoided, and noise is reduced. In addition, the power conversion device is able to be operated at high frequencies, realizing miniaturization of passive components. Further, forming the resonance circuit enables specific harmonics to be reduced.

Fourth Preferred Embodiment

Figure 7:
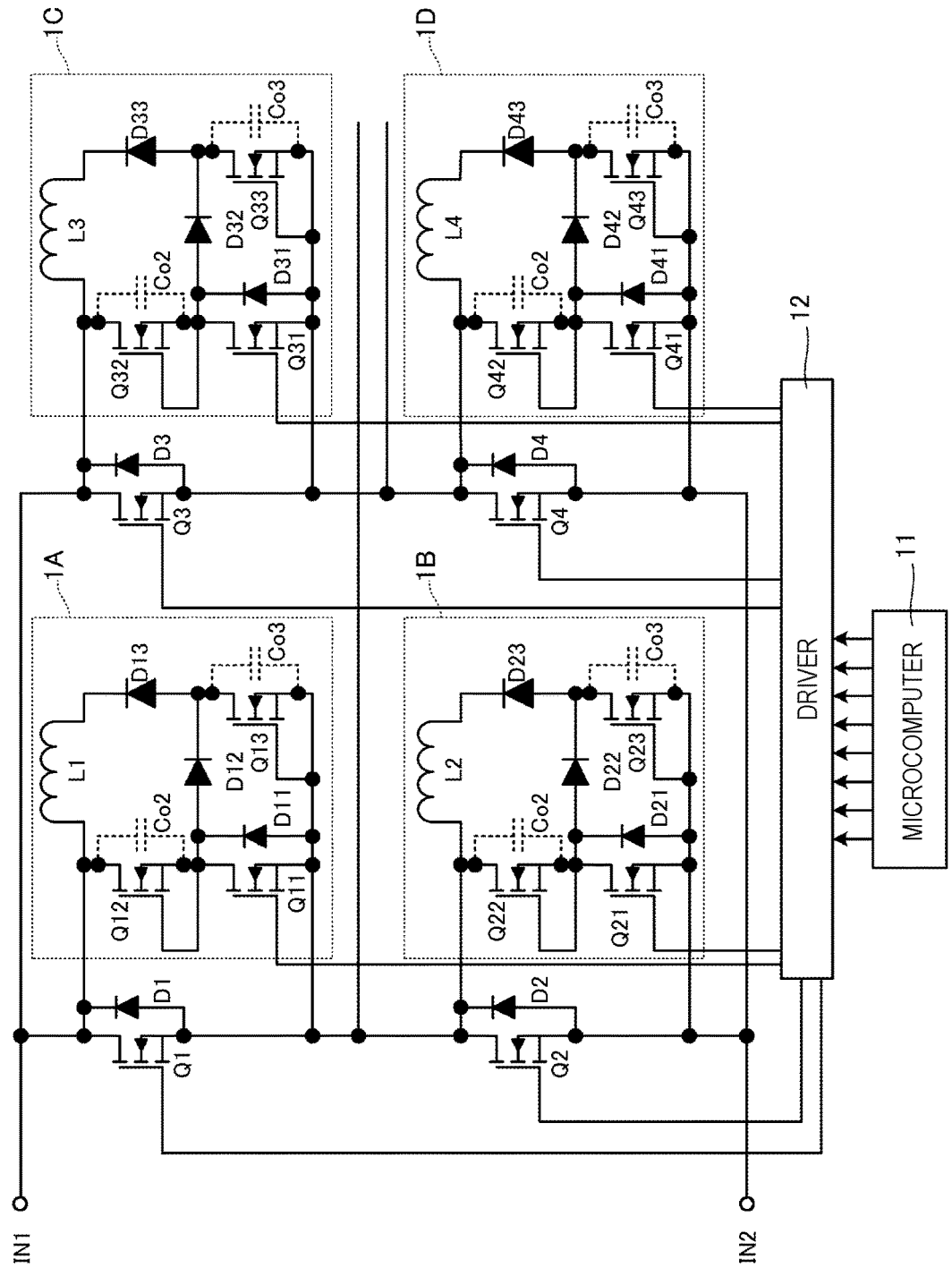
FIG. 7 is a circuit diagram illustrating configurations of the switching adjustment circuits 1A, 1B, 1C, and 1D according to a fourth preferred embodiment of the present invention.

FIG. 7 is a circuit diagram illustrating configurations of switching adjustment circuits 1A, 1B, 1C, and 1D according to a fourth preferred embodiment of the present invention.

The switching adjustment circuit 1A according to the fourth preferred embodiment differs from the switching adjustment circuits according to the third preferred embodiment in that the two capacitors in each of the switching adjustment circuits 1A, 1B, 1C, and 1D according to the third preferred embodiment are replaced with switching elements. In the switching adjustment circuit 1A, switching elements Q12 and Q13 are preferably Si-FETs, for example, in which the gate and the source are directly connected. Thus, the switching elements Q12 and Q13 remains off state all the time. The switching elements Q12 and Q13 have output capacitances Co2 and Co3, and the capacitors C12 and C14 in the third preferred embodiment are substituted with the output capacitances Co2 and Co3.

The switching element Q12 corresponds to a "fourth semiconductor switch", and the switching elements Q13 corresponds to a "fifth semiconductor switch".

Thus, substituting both of the capacitors C12 and C14 with the output capacitance Co2 of the switching element Q12 and the output capacitance Co3 of the switching element Q13 makes chip capacitors unnecessary and enables miniaturization. Specifically, at least the switching elements Q12 and Q13 and the diodes D12 and D13 are able to be integrated in a single chip, so as to reduce or prevent an increase in size and cost. Configurations and operation of the switching adjustment circuits 1B, 1C, and 1D are the same or similar to the configuration and operation of the switching adjustment circuit 1A.

Waveforms of the voltage $V_{DS}$ in the present preferred embodiment are the same or substantially the same as those in FIG. 6. The capacitors C12 and C14 in other preferred embodiments may also be substituted with the switching elements.

Fifth Preferred Embodiment

A power conversion device according to a fifth preferred embodiment of the present invention differs from the power conversion devices according to the first to fourth preferred embodiments in that switching adjustment circuits are not operated when a load is light.

Figure 8:
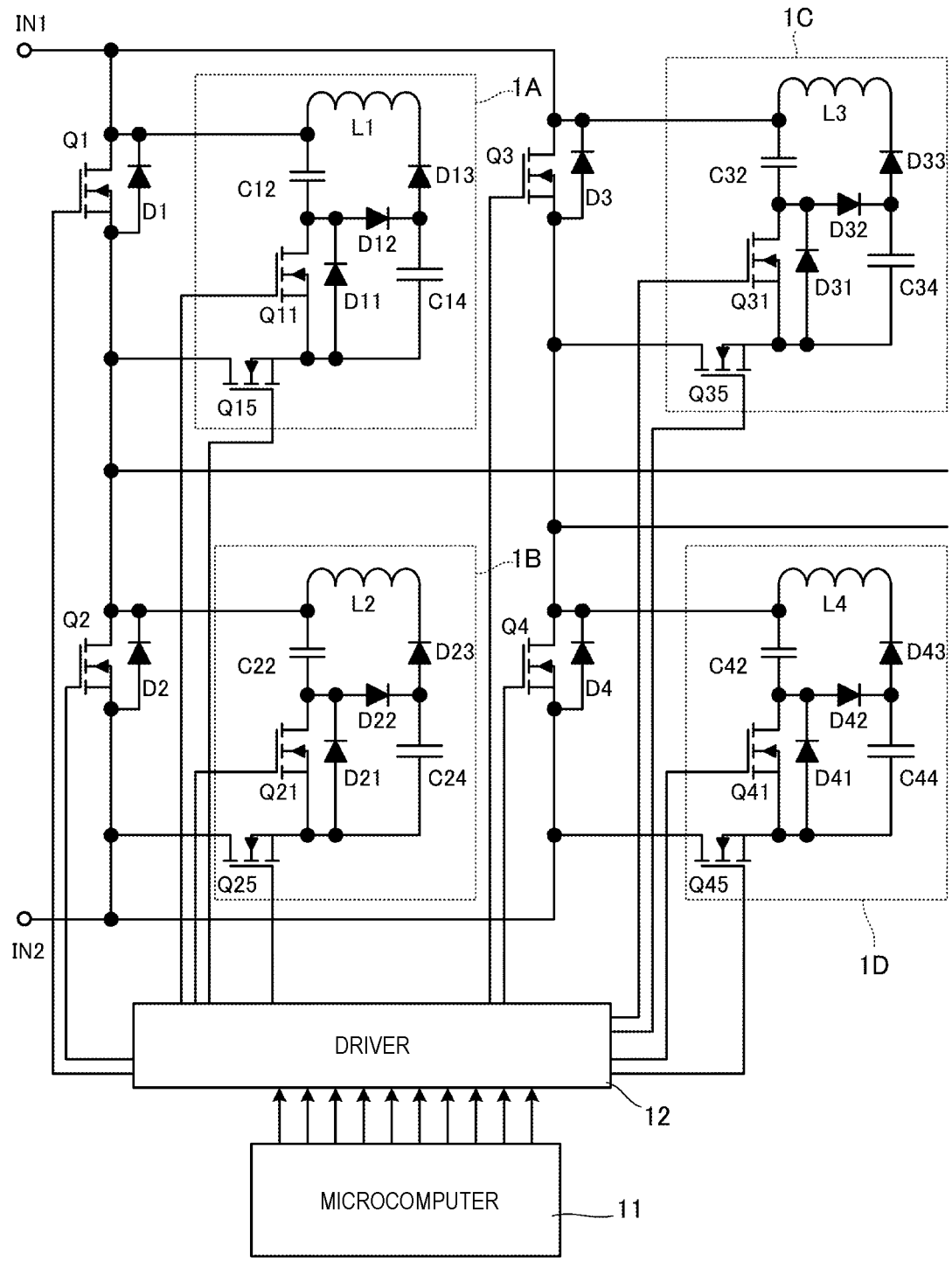
FIG. 8 is a circuit diagram illustrating configurations of the switching adjustment circuits 1A, 1B, 1C, and 1D according to a fifth preferred embodiment of the present invention.

FIG. 8 is a circuit diagram illustrating configurations of switching adjustment circuits 1A, 1B, 1C, and 1D according to the fifth preferred embodiment.

The switching adjustment circuit 1A includes a switching element Q15. The switching element Q15 is preferably a Si-FET, for example, and disposed at some or substantially the same position on a line connecting the source of the switching element Q1 and the source of the switching element Q11. The switching element Q15 is always in on state in normal operation, but, when a load is light, the microcomputer is configured and/or programmed to determine that the load is light by detecting the input current or by acquiring the load current from the secondary side. Then, the switching element Q15 is turned off. When the switching element Q15 is turned off, no current flows to the capacitor C12. Thus, the switching adjustment circuit 1A (first capacitance addition circuit) does not operate when the load is light. Configurations and operation of the switching adjustment circuits 1B, 1C, and 1D are the same or similar to the configuration and operation of the switching adjustment circuit 1A.

Each of the switching elements Q15, Q25, Q35, and Q45 corresponds to a "cutoff unit". These switching elements Q15, Q25, Q35, and Q45 may be disposed in switching adjustment circuits in other preferred embodiments.

Sixth Preferred Embodiment

A power conversion device according to a sixth preferred embodiment of the present invention is applied as a system interconnection inverter and differs from the power conversion devices according to the first to fifth preferred embodiments in that dead times of the switching elements Q1 and Q2 are adjusted in accordance with load amount.

Figure 9:
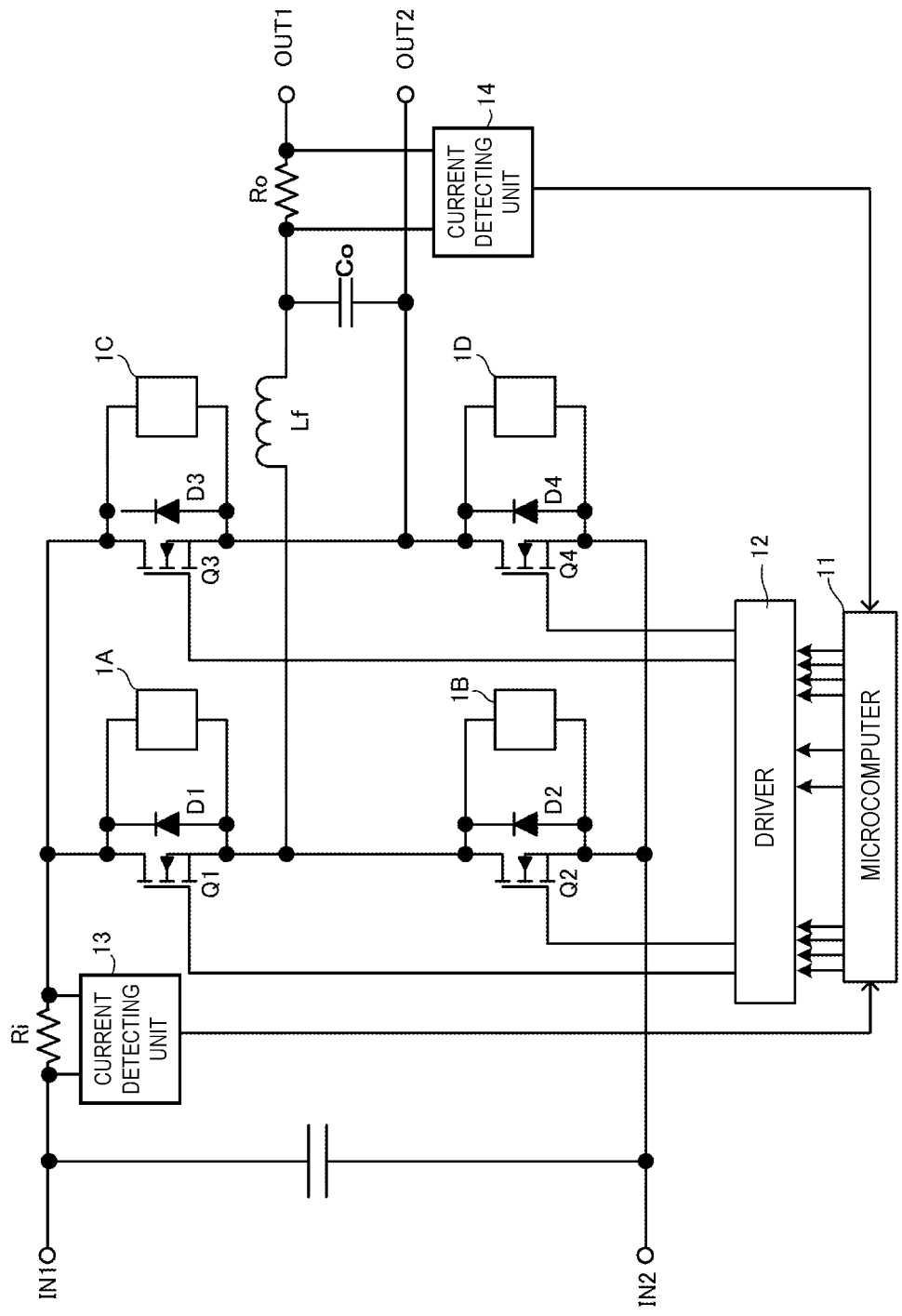
FIG. 9 is a circuit diagram of the power conversion device 101 according to a sixth preferred embodiment of the present invention.

FIG. 9 is a circuit diagram of the power conversion device according to the sixth preferred embodiment. FIG. 9 differs from FIG. 1 in that a full-bridge circuit is used instead of the LLC converter, a transformer is not used, and the output on the secondary side is a commercial alternating current voltage instead of a direct current voltage.

Figure 10:
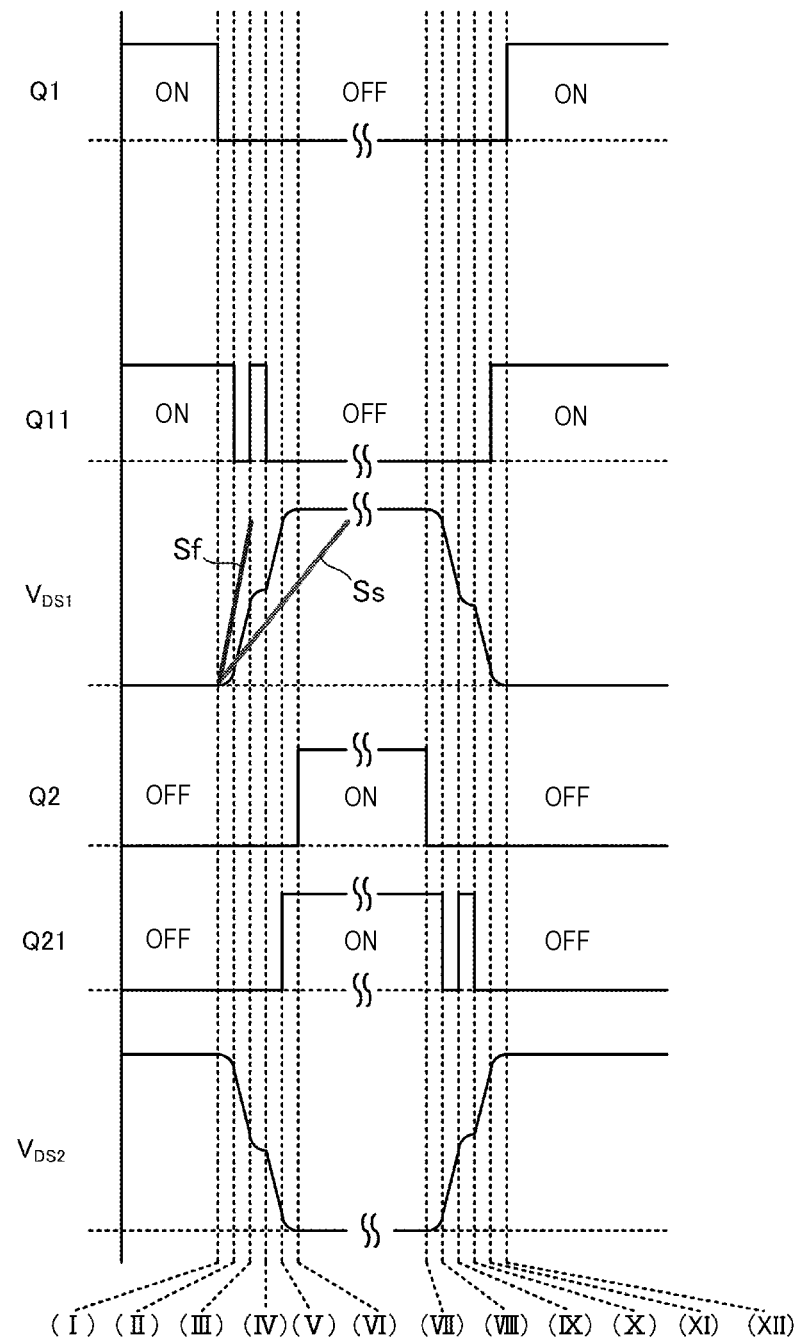
FIG. 10 depicts waveforms illustrating changes in conditions and voltages of individual elements of the power conversion device according to the sixth preferred embodiment of the present invention.

FIG. 10 depicts waveforms illustrating changes in conditions and voltages of individual elements in the power conversion device according to the present preferred embodiment. This diagram corresponds to the diagram depicted in FIG. 6 in the third preferred embodiment.

The power conversion device according to the present preferred embodiment is preferably an inverter, for example, and the load current has a sine or substantially sine waveform. A load current at or around a zero-crossing point is small, and a rising speed of $V_{DS}$ is slow as depicted by an example slope Ss in FIG. 10. On the other hand, a current is large at or around a peak, and the rising speed of $V_{DS}$ is fast as depicted by a slope Sf in FIG. 10.

When the rising speed of $V_{DS}$ is slow, a long dead time is needed to obtain a waveform of $V_{DS}$ having gradual changes. In contrast, when the rising speed of $V_{DS}$ is fast, a short dead time is needed. Otherwise, the dead time may remain even after completion of resonance caused by the last turning-on of the switching element Q11 after a plurality of times of turning-on and turning-off, and the switching element Q11 may be turned off when $V_{DS}$ has decreased, leading to an increase in loss.

Thus, in the present preferred embodiment, the time period during which the switching element Q11 remains on is adjusted in addition to the dead times of the switching elements Q1 and Q2.

Variation rates of the voltages $V_{DS1}$ to $V_{DS4}$ between terminals during the respective dead times of the switching elements Q1 to Q4 differ considerably from one another, and optimum dead times are different from one another. Thus, the dead times are appropriately adjusted by detecting the load current. In this manner, highly efficient operation at all times is ensured irrespective of the load amount.

Adjusting the dead times may be performed, for example, in three stages such as "heavy load", "normal load", and "light load" or may be performed by detecting the load current at all times and changing the dead times continuously.

Seventh Preferred Embodiment

A power conversion device according to a seventh preferred embodiment of the present invention is configured to adjust the dead times of the switching adjustment circuits 1A to 1D depicted in FIG. 9 in the sixth preferred embodiment in accordance with load amount.

Figure 11:
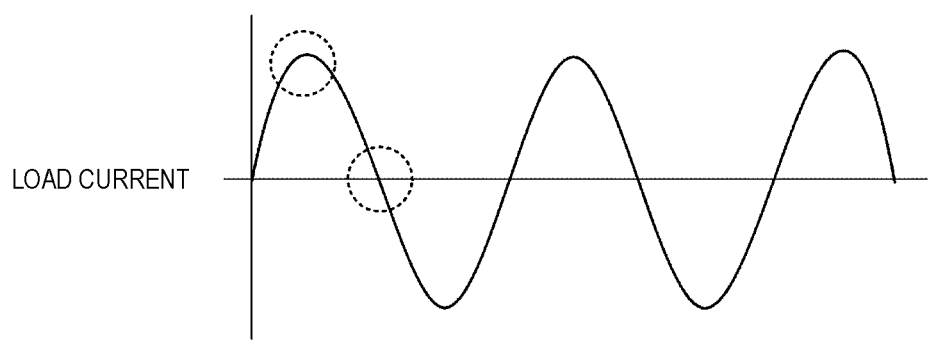
FIG. 11 depicts a waveform of a load current of a power conversion device according to a seventh preferred embodiment of the present invention.

FIG. 11 depicts a waveform of a load current of the power conversion device according to the present preferred embodiment. The power conversion device in the present preferred embodiment is preferably an inverter, for example, and the load current has a sine or substantially sine waveform. As depicted in FIG. 11, the load current is considerably different at or around a zero-crossing point and at or around a peak.

Consequently, amounts of electric charge stored in the capacitors C12, C22, C32, and C42 included in the switching adjustment circuits 1A, 1B, 1C, and 1D, respectively, are considerably different from one another. Unless all of the amounts of electric charge are regenerated during a regeneration time period, loss is generated. Thus, in the present preferred embodiment, the amounts of electric charge stored in the capacitors C12, C22, C32, and C42 are controlled by adjusting on times of the switching elements Q11, Q21, Q31, and Q41. This leads to higher efficiency in driving.

Adjusting the on times of the switching elements Q11, Q21, Q31, and Q41 may be performed, for example, in three stages such as "heavy load", "normal load", and "light load" or performed by detecting the load current at all times and changing the on times continuously.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A power conversion device comprising:
a power conversion circuit that performs switching control of a first semiconductor switch and a second semiconductor switch connected in series and converts an input direct current voltage into an alternating current voltage;
a first capacitance addition circuit that increases an output capacitance of the first semiconductor switch;
a first driving control circuit that drives and controls the first capacitance addition circuit;
a second capacitance addition circuit that increases an output capacitance of the second semiconductor switch; and
a second driving control circuit that drives and controls the second capacitance addition circuit; wherein
the first capacitance addition circuit includes a first capacitive element, a first switching circuit, and a first resonant circuit including a first inductor that resonates with the first capacitive element, a first diode, and a second capacitive element;

the first inductor, the first diode, and the second capacitive element are connected in series, and the first capacitance addition circuit is connected in parallel to the first semiconductor switch;

the first driving control circuit turns on the first switching circuit while or before the first semiconductor switch is turned on, increasing the output capacitance of the first semiconductor switch, and turns off the first switching circuit when a predetermined time period elapses after the first semiconductor switch is turned off;

the second capacitance addition circuit includes a third capacitive element, a second switching circuit, and a second resonant circuit including a second inductor that resonates with the third capacitive element, a second diode, and a fourth capacitive element;

the second inductor, the second diode, and the fourth capacitive element are connected in series, and the second capacitance addition circuit is connected in parallel to the second semiconductor switch; and the second driving control circuit turns on the second switching circuit while or before the second semiconductor switch is turned on, increasing the output capacitance of the second semiconductor switch, and turns off the second switching circuit when a predetermined time period elapses after the second semiconductor switch is turned off.

2. The power conversion device according to claim 1, further comprising:

a third diode connected across a node between the first capacitive element and the first switching circuit and a node between the first diode and the second capacitive element; and a fourth diode connected across a node between the third capacitive element and the second switching circuit and a node between the second diode and the fourth capacitive element; wherein the first diode is connected in a direction in which a resonance current flows from the second capacitive element into the first inductor;

the second diode is connected in a direction in which a resonance current flows from the fourth capacitive element into the second inductor;

the third diode is connected in a direction in which a charging current flows through the first capacitive element into the second capacitive element, and the second capacitive element has a smaller capacitance than the first capacitive element; and the fourth diode is connected in a direction in which a charging current flows through the third capacitive element into the fourth capacitive element, and the fourth capacitive element has a smaller capacitance than the third capacitive element.

3. The power conversion device according to claim 2, wherein the first capacitive element is a fourth semiconductor switch having a parasitic capacitance, and the second capacitive element is a fifth semiconductor switch having a parasitic capacitance.

4. The power conversion device according to claim 3, wherein at least the fourth semiconductor switch, the fifth semiconductor switch, the first diode, and the third diode are included in a single integrated circuit.

5. The power conversion device according to claim 1, further comprising:

a current detector that detects a magnitude of a load current, which is an output current from the power conversion circuit; and a dead-time adjusting circuit that adjusts, in accordance with the magnitude of the load current, a length of time during which the first semiconductor switch and the second semiconductor switch are both off.

6. The power conversion device according to claim 5, wherein the dead-time adjusting circuit adjusts, in accordance with the magnitude of the load current, a length of time during which the first switching circuit is on.

7. The power conversion device according to claim 1, further comprising:

a current detector that detects a magnitude of a load current, which is an output current from the power conversion circuit; and a cutoff circuit that cuts off a charging path to the first capacitive element when the load current falls below a threshold.

8. The power conversion device according to claim 1, wherein the first semiconductor switch and the second semiconductor switch are gallium nitride semiconductor devices; and the first switching circuit is a silicon semiconductor device.

9. The power conversion device according to claim 1, wherein the first semiconductor switch and the second semiconductor switch are SiC or Si semiconductor devices.

10. The power conversion device according to claim 1, wherein the first driving control circuit includes a microcomputer.

11. A power conversion device comprising:

a power conversion circuit that performs switching control of a first semiconductor switch and a second semiconductor switch connected in series and converts an input direct current voltage into an alternating current voltage;

a first capacitance addition circuit that includes a first capacitive element and a first switching circuit connected in series and is connected in parallel to the first semiconductor switch; and a first resonant circuit that includes a first inductor that resonates with the first capacitive element, a first diode, and a second capacitive element; wherein the first inductor, the first diode, and the second capacitive element are connected in series, and the first resonant circuit is connected in parallel to the first capacitance addition circuit:

the first switching circuit is turned to an on-state at a time point while or before the first semiconductor switch is turned on; and the first switching circuit is turned to an off-state after the first semiconductor switch is turned off.

12. The power conversion device according to claim 11, further comprising:

a second diode connected across a node between the first capacitive element and the first switching circuit and a node between the first diode and the second capacitive element; wherein the second capacitive element has a smaller capacitance than the first capacitive element;

the first diode is connected in a direction in which a resonance current flows from the second capacitive element into the first inductor; and the second diode is connected in a direction in which a charging current flows through the first capacitive element.

13. The power conversion device according to claim 11, further comprising:

a current detector that detects a magnitude of a load current, which is an output current from the power conversion circuit; and a dead-time adjusting circuit that adjusts, in accordance with the magnitude of the load current, a length of time during which the first semiconductor switch and the second semiconductor switch are both off.

14. The power conversion device according to claim 11, further comprising:

a current detector that detects a magnitude of a load current, which is an output current from the power conversion circuit; and a cutoff circuit that cuts off a charging path to the first capacitive element when the load current falls below a threshold.

15. The power conversion device according to claim 11, further comprising:

a second capacitance addition circuit that includes a third capacitive element and a second switching circuit connected in series and is connected in parallel to the second semiconductor switch; and a second driving control circuit that drives and controls the second capacitance addition circuit; wherein the second driving control circuit is turned to an on-state at a time point while or before the second semiconductor switch is turned on, and the second switching circuit is turned to an off-state after the second semiconductor switch is turned off.

* * * * *